United States Patent
Russell

[19]

[11] Patent Number: 6,119,715
[45] Date of Patent: Sep. 19, 2000

[54] AUTOMATED PNEUMATIC PURGER

[76] Inventor: Larry R. Russell, 3607 Gramercy, Houston, Tex. 77025-1320

[21] Appl. No.: 08/941,767

[22] Filed: Sep. 30, 1997

[51] Int. Cl.$^7$ .................... B65D 25/00; H02B 13/055; F24F 11/02

[52] U.S. Cl. .................. 137/240; 137/312; 137/377; 137/382; 137/487.5; 137/554; 220/88.1; 220/88.3; 307/118; 307/328; 340/611; 361/2; 454/184; 454/238; 454/239; 454/359

[58] Field of Search ........................... 137/240, 312, 137/377, 382, 487.5, 554; 220/88.1, 88.3; 307/118, 328; 340/611; 361/2; 454/184, 238, 239, 359

[56] References Cited

U.S. PATENT DOCUMENTS

| | | | |
|---|---|---|---|
| 4,802,502 | 2/1989 | Williams | 137/382 |
| 5,101,710 | 4/1992 | Baucom | 454/238 |
| 5,146,103 | 9/1992 | Obata et al. | 307/118 |

*Primary Examiner*—George L. Walton
*Attorney, Agent, or Firm*—Elizabeth R. Hall

[57] ABSTRACT

An automatic control system for providing pneumatic purging protection for a sealed enclosure containing electrical equipment in accordance with the National Fire Protection Association standards. The system supplies a purge gas under a pre-ordained pressure to an enclosure residing in a hazardous location. The system monitors the gas pressure to maintain the pressure within desired limits. In the event that the integrity of the sealed enclosure is disrupted, the control system disables the electrical equipment and executes a rapid-response purge cycle to re-enable the electrical equipment as quickly as possible.

4 Claims, 2 Drawing Sheets

AUTOMATED PNEUMATIC PURGER

BACKGROUND OF THE INVENTION

1. Field of the Invention

An automated isolate manifold system for purging enclosures used to isolate potentially dangerous electrical switchgear or other equipment from the presence of a hazardous atmospheric environment.

2. Discussion of Related Art

The National Fire Protection Association has established standards for providing purged and pressurized enclosures for containing potentially hazardous electrical equipment. Such enclosures are required in the presence of explosive chemical atmospheres or vapors in chemical plants and combustible materials such as in grain elevators. See for example, publication NFPA 496.

In general, the equipment to be isolated is mounted in a pressurized enclosure. The enclosure is pressurized above the local ambient pressure by means of a remote purge-gas manifolding system. If the enclosure loses its required overpressure such as by the opening of the enclosure or by loss of the inert fluid supply thereof, the equipment controlled by the switchgear of the manifolding system is shut down until the enclosure regains its protective capabilities.

One such system is taught by U.S. Pat. No. 4,802,502, issued Feb. 7, 1989 to Henry L. Williams and assigned to Geolograph Pioneer Inc. Here, a pneumatically operated purge control system provides a non-hazardous environment within an electronics enclosure comprised of a purge air box housing non-electrical components having fluid communication lines between them. An outlet supplies inert gas under pressure from a supply to the enclosure and an inlet receives inert gas under pressure from the enclosure. A pressure regulator, mounted in the box in fluid communication with the supply, provides the air to a manifold distributing air to a flow meter for providing flow of air to the enclosure through the outlet and for determining the rate of flow to the outlet. A signal valve having one inlet communicating with the manifold and another inlet communicating with the inlet; the signal valve having an outlet providing a pneumatic signal when pressure is received at the inlet. A first pneumatic light on the box connected to the outlet of the signal valve indicates the status of the air coming from the enclosure. A time-delay pneumatic relay connected to the outlet of the signal valve provides a delayed signal responsive to the signal received by the signal valve. An explosion-proof pneumatically-operated switch connected to the output of the time delay relay provides electrical power to the enclosure responsive to the delayed signal. A second pneumatic light on the box responsive to the delayed signal indicates the status of the electrical power going into the enclosure. The system includes a two-way valve actuating an alarm system when pressure from the enclosure falls below a predetermined value.

Being substantially mechanical in operation, the '502 system is relatively inflexible in adapting to variable operational episodes. If, for example, the volumetric capacity of the enclosure were changed, such as to accommodate additional electronic modules, the original time delay relay 58 of FIG. 6 of the patent would need to be adjusted or physically replaced by a relay with a different delay. Additionally there appears to be no provision to compensate for enclosure leakage.

U.S. Pat. No. 5,146,105, issued Sep. 8, 1992 to M. Obata et al., teaches an internal pressure explosion proof system by which an electric motor or the like is not rendered operative until after gas in an airtight vessel is replaced with certainty by protective gas. The internal pressure explosion proof system includes a gas flow detector provided in an exhaust pipe for detecting the amount of protective gas exhausted from an airtight vessel in which an electric appliance which may produce a spark or fire, is accommodated and a controller for enabling operation of the electric appliance when a flow amount detected by the gas flow rate detector when protective gas is fed to the airtight vessel reaches a predetermined level and the internal pressure of the airtight vessel exceeds the predetermined level.

U.S. Pat. No. 5,101,710, issued Apr. 7, 1992 to M. K. Baucom and assigned to Bebco Industries Inc. provides a control apparatus or system for purged and pressurized electrical equipment. According to the Abstract, the system provides rapid controlled exchange of pressurizing or purge gas at the electrical enclosure. The control system or apparatus for NFPA type Y and Z electrical equipment enclosure has a source of pressurizing gas, rapid exchange pressure control filter/regulator, rapid exchange pressure gauge and control valve and a manual inlet valve providing rapid exchange of purging gas to the electrical enclosure during start up, an enclosure control valve, enclosure pressure indicator, a venturi providing controlled leakage from the system and a pressure loss control alarm or switch. Another embodiment of the control system or apparatus for NFPA Type X electrical equipment enclosures has a rapid exchange pressure control filter/regulator, rapid exchange pressure gauge, vent control valve and an automatic inlet valve providing for rapid exchange of purging gas to the electrical enclosure during start up and enclosure control valve, enclosure pressure indicator, a venturi providing controlled leakage from the system and a pressure loss alarm or switch. The rapid exchange purging flow is timed by an internal clock or relay to flow for a fixed time dependent only on enclosure size.

A disadvantage of the '710 system is the need for rather complex electrical circuitry. Further, no provision appears to be provided for reprogramming the system so as to adapt a single basic system to the changing needs of a dynamic control system having general applicability. The disclosure teaches that at least seven distinct variants of the control system are required.

There is a need for a flexible control capability for a purge-air control system that is readily programmable to update the system to accommodate changing service environments.

SUMMARY OF THE INVENTION

A control system is used for providing the purge-air supply to a protective enclosure that isolates electronic equipment from a hazardous environment. The control system includes a manifold block having a fluid inlet line that is coupled to a regulated supply of an inert fluid. The manifold block includes parallel fluid lines having a common outlet coupled to the protective enclosure. One branch of the parallel fluid lines contains a leakage-compensation bleed valve for enclosure leakage compensation. The other branch includes a flow-meter of the pitot-static tube type for admitting, under programmable control, a measured preselected volume of inert fluid into the protective enclosure to execute a rapid-response purge cycle. An explosion-proof module is provided for containing the electrical/electronic components of the system, especially a microprocessor having a desired program resident therein. The microprocessor is interconnected with the protective enclosure and the manifold block for monitoring the fluid pressure in the protective enclosure, for executing a rapid-response purge cycle in reaction to an undesired fluid-pressure drop in said protective enclosure, for maintaining a desired pressure range inside the protective enclosure during normal operation and for displaying system status. An optical code-reader is provided to allow changes in the microprocessor program without violating the integrity of the explosion-proof module.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
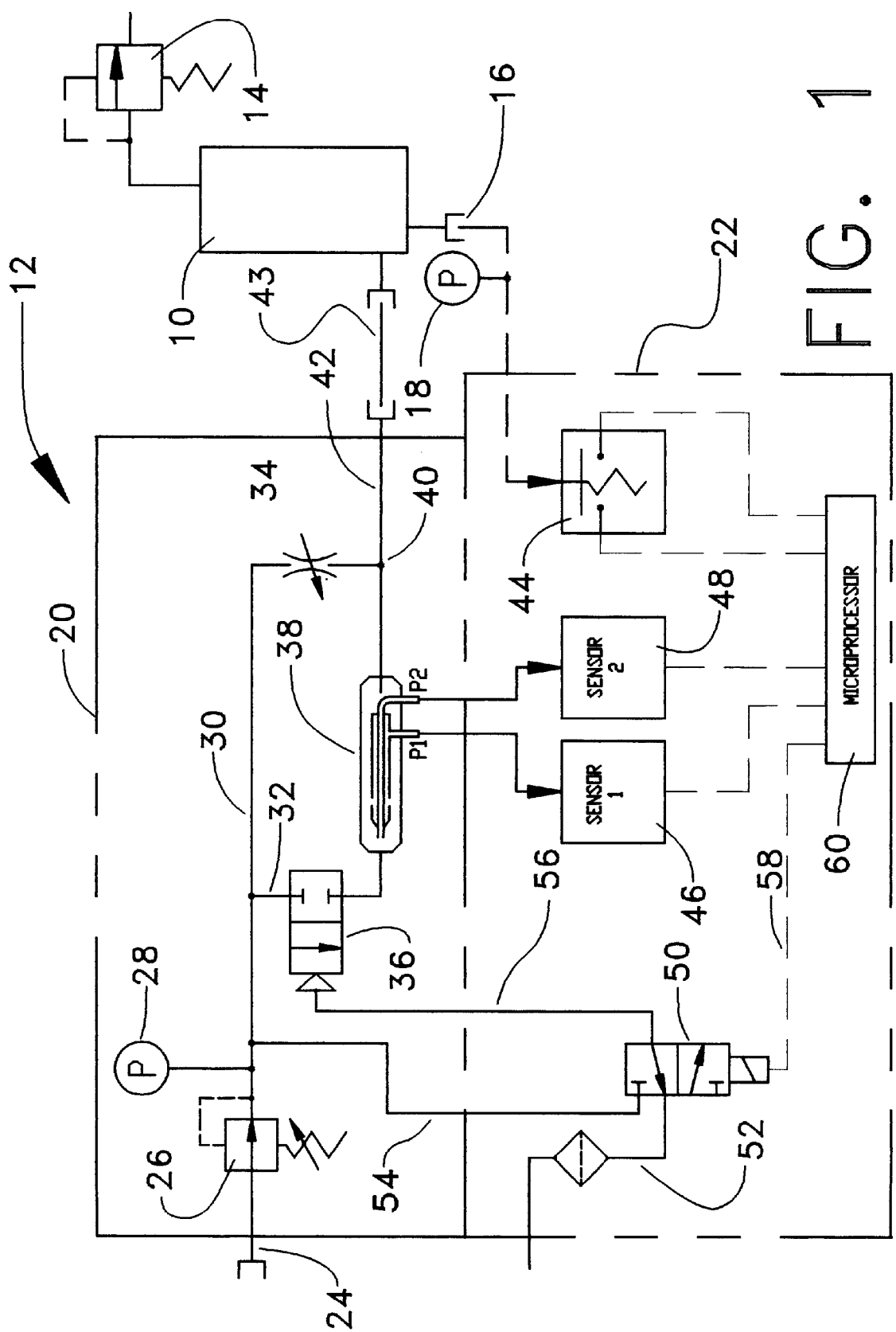
FIG. 1 is a schematic drawing of the functional arrangement of the controls of the purging device.

The automatic purger control system is designed first, to maintain a supply of inert purge fluid within preselected pressure limits to a secure protective enclosure, 10, of any desired type. Secondly, in the event that the security of the enclosure is lost due to an undesired drop in the purge-fluid pressure, to interrupt electrical power to the enclosure and to indicate a fault or alarm condition. Thirdly, when the purge-fluid pressure is restored in the enclosure following immediately after the alarm, to execute a high-speed rapid-response purge cycle. High-speed response is necessary to ensure the return of the protected operational equipment back to normal production without undue interruption.

Enclosure 10 is a sealable container which protects electronic equipment, that resides in a hazardous environment, to prevent fire or explosion due to electrical sparks, excessive heat or the like. Although any inert fluid may be used, for convenience this invention will be disclosed as employing an inert gas by way of example but not by way of limitation. Any desired inert gas may be used such as dry purified air, dry nitrogen or carbon dioxide.

The purge-control system that comprises this invention is a separate module, generally shown as 12, that may attach externally to the protective enclosure 10 or the control module may be remotely located. The protective enclosure will usually have a pressure relief valve 14 of the flame-arresting type to prevent excessive purge-gas pressure buildup. A pressure-communication line, 16, including a pressure gauge sensor, 18, interconnects enclosure 10 with control system 12 to allow control system 12 to monitor the purge-gas pressure status in enclosure 10.

The automatic purge-control system 12 consists of two subsystems: A pneumatic manifold block 20 and an electronic control unit 22. Considering first, the manifold block 20, gas from a source (not shown) enters control system 12 through inlet line 24 and flows to a pressure regulator 26 which may include a visual readout gauge 28.

The line from pressure regulator 26 is split into parallel branches 30 and 32. Branch 30 includes a needle valve 34 for controlling the gas flow during normal operations to compensate for gas leakage. This purge-maintenance flow control is manually preset by the operator who adjusts the flow to maintain the pressure in the protective enclosure 10 within a specified range.

The second branch, 32, provides a high-speed flow control capability. Flow in this branch is controlled by normally-closed, two-way gas-piloted poppet valve 36. Application of pilot pressure to the pilot chamber of poppet valve 36 causes it to open to permit high-speed, high-volume gas flow into enclosure 10. The flow volume is measured by a series-connected flowmeter 38 of the pitot-static tube type. The two branch lines 30 and 32 then rejoin at junction 40 to gas outlet line 42 which is connected through line 43 to enclosure 10 to provide a regulated supply of purge gas thereto.

The pneumatic circuitry portion of the electronic control unit, shown as 22 in FIG. 1, includes a pressure switch 44 that is coupled to feedback pressure line 16. Alternatively, a pressure sensor may be used in place of pressure switch 44 to overcome the inherent difficulties with the dead band associated with pressure switch reclosure. In such case, the threshold pressure is sensed with a numerical comparator. Pressure switch 44 remains closed so long as a preselected minimum pressure threshold exists in enclosure 10. Pitot-pressure and static-pressure sensors 46 and 48, coupled to flowmeter 38, provide an analog readout of the data needed to calculate gas-flow volume. A normally closed pilot control valve 50 and valve exhaust vent 52 are provided. Pilot valve 50 receives a gas supply over pneumatic line 54 from gas inlet line 24. Pilot control valve 50 is coupled to gas-piloted poppet valve by line 56. When open, pilot valve actuates poppet valve 36 to open branch line 32 during a rapid-response purge cycle.

Figure 2:
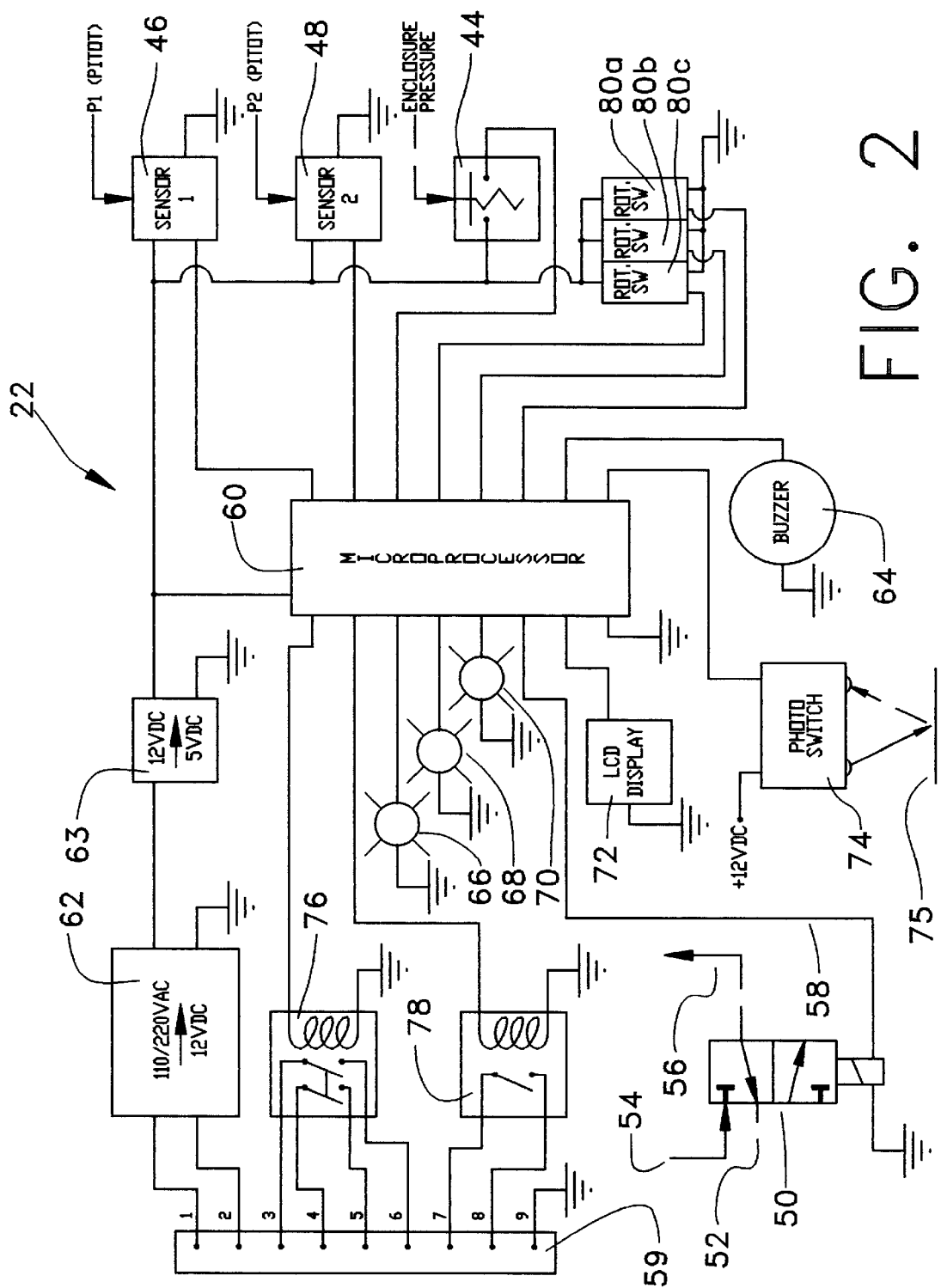
FIG. 2 is a wiring diagram of the system.

Please refer now to FIGS. 1 and 2. In FIG. 1, the pneumatic components of the electronic control unit 22 are discussed; in FIG. 2, the electronic details are disclosed. The electronics are contained in an explosion-proof housing, not shown, that has a clear glass or plastic window. The housing contains the following items: a terminal strip 59; a programmed microprocessor, 60 (which is shown in both FIGS. 1 and 2); a conventional power supply, 62 and a DC voltage converter 63; pressure switch 44; the two analog pressure sensors 46 and 48 connected to flowmeter 38; an is alarm buzzer 64; status-indicating LEDs 66, 68, 70; a liquid crystal display 72 for providing written system-status messages; control valve 50 previously described; an optical code reader 74 for use in communicating with microprocessor 60; a double-pole normally open relay 76 for controlling enclosure power; a single-pole normally open relay 78 for auxiliary power; and a set of rotary switches 80a, 80b, 80c, which may be used for manually programming the microcomputer with the volumetric capacity of the protective enclosure. Alternatively, that function might conveniently be performed via optical code reader 74 either as an alternate method or in place of manual entry through the rotary switches 80a,b,c.

The explosion-proof housing (not shown) is provided with sealed openings for incoming electrical power, for outgoing electrical power feeding the equipment contained in protective enclosure 10, for admission of feedback pressure from the enclosure, for the pitot tube 38 which projects its probe from the housing into the sealed entry into the manifold block and thence into the flow passage 32 associated with the poppet valve 36, for supply gas line 54 from control valve 50 to gas-piloted poppet valve 36, and for a service opening that can be sealed with a removable cover (not shown) which also includes the clear window.

Power supply 62 of any desired type, converts incoming 110 or 220 volt AC power to the 12 v DC and voltage converter 63 converts 12 v DC to 5 v DC power; both are normally used by the electronic components.

Programmable microprocessor, 60, of any desired type, with an on-board non-volatile memory is used for the logical operations of the control system. The microprocessor accepts either digital or analog inputs from the respective switches and sensors using either internal or external A/D converters. Microprocessor output data are used to perform switching functions to activate either directly or indirectly or by activating intermediate devices, or to control voltages different than that of the microprocessor and/or to control higher-power circuits. Thus, the microprocessor controls the entire system.

The pressure input data from the two flowmeter sensors 46 and 48 are used by the microprocessor to measure the volumetric flow of the purge gas flow through the manifold block during execution of a rapid-response purge cycle. Given the absolute pressure of one of the flowmeter taps, the instantaneous gas flow rate can be calculated from the pressure difference across the taps. Integration of the instantaneous flow rate with respect to time, as derived from the internal clock of the microprocessor, provides the actual cumulative flow volume into the enclosure.

The pressure switch 44 is a feedback circuit that senses the enclosure pressure. If pressure is lost or is reduced below a predetermined minimum in the enclosure, pressure switch 44 changes state and sends a signal to the microprocessor. The microprocessor then sends a signal to an audible warning device. The warning device is actuated by the microprocessor rather than by the pressure switch 44 so that the device can be operator over-ridden. Three light emitting diodes (LED) of different colors, under control of the microprocessor, indicate purge system status. One indicates normal operations, a second LED indicates a power loss and the third LED signals execution of a rapid-response purging cycle. A liquid crystal display may be provided to provide diagnostic system messages to the operator. The optical code reader provides a convenient means for turning off the audible warning device, entering system parameters such as the volumetric capacity of the enclosure, minor program changes and the like.

Control valve 50 is a solenoid-operated, three-way, two position, normally closed valve under the control of the microprocessor. The microprocessor selectively opens the valve by applying a voltage to the solenoid 50 over line 58 when it determines that a high-speed purging is required. When open, the control valve 50 applies pressure to the pilot port of the high-flow-capacity poppet valve 36 in the manifold block. When deactivated, valve 50 vents the pilot pressure on the poppet valve allowing it to close and thereby turn off the high speed purging flow.

In a simplification of the system, optical code reader 74 might simply be a retro-reflective photo switch. When a reflective object, 75, such as the hand is held in front of the retroreflector, the photo switch is activated to turn off, for example, the audible warning device.

The double-pole, normally open relay 76 is used to control the power to the enclosure. The input is from two terminals on terminal strip 59 and output is through two other terminals on the same strip. The microprocessor functions to activate or deactivate the relay. Similarly the input and output of microprocessor-controlled relay 78 are terminated on terminal strip 59 and may be used to activate an external auxiliary audible pressure-loss alarm (not shown).

The set of rotary switches permits the operator to enter the actual volumetric capacity of the protective enclosure under consideration. Alternately those data could be entered via the optical code reader as backup.

It is assumed that the automatic purge-control system has been installed in association with an enclosure to be serviced and that the microprocessor has been properly programmed. The best mode of operation as presently contemplated consists of first entering the volumetric capacity, measured in units of choice, of the protective enclosure into the system via the rotary switches or through the optical code reader 74. The desired inert gas supply is connected to line 24 of the manifold block and the regulator 26 is set to provide to recommended operational purge-maintenance pressure. The needle valve 34 is adjusted to sufficiently maintain the purge-gas pressure inside enclosure 10 at the preassigned level set by relief valve 14, compensating for minor leakage. That is a normal operational cycle during which, perhaps a "Normal"-colored status light might glow.

If enclosure 10 is opened or if the system gas supply is lost, pressure switch 44 changes state and microprocessor 60 de-energizes relay 76 to cut power to enclosure 10. The audible alarm device such as a buzzer 64 or a horn, sounds, the "Normal"-colored LED is shut off and replaced by a "Warning"-colored LED indicating loss of purge and a status message appears on the LCD display. If annoying, the buzzer or horn can be shut off manually, using the retro-reflecting switch or the optical code reader, as previously explained.

When the enclosure is again properly closed or the purge-gas supply replenished, the microprocessor causes a rapid-response purge cycle to be executed. Upon a signal over line 58 from microprocessor 60, control valve 50 opens to admit a flow of gas through line 56 to gas-piloted poppet valve 36 thereby opening that valve. A high-volume, high speed flow of purge gas now flows through branch line 32 and into enclosure 10 over connecting line 43. During this time, the "Purge Execute"-colored LED is turned on. In combination with microprocessor 60, flowmeter 38 continuously measures the volume of purge gas flowing through the control system. When microprocessor calculates that the volume of purge gas transferred to enclosure 10 is equal to the NFPA required multiple of volumetric capacity of the enclosure as initially entered into the system through the rotary switches or the optical code reader, the system switches back to the normal state and relay 76 restores power to enclosure 10. The "Normal"-colored LED is relit and the audible warning device, if still alive, is silenced. Although it has been assumed here that only a single unit-enclosure volume of purge gas is used for a purge cycle execution, the microprocessor may be programmed to flush the enclosure with more than one unit-enclosure volume of purge gas as required by the NFPA standards for a particular installation.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A programmable control system for automatically controlling a supply of purging fluid flowing into a protective enclosure for sheltering electron equipment from a hazardous environment, comprising in combination:

a manifold block having a fluid inlet line coupled to a regulated supply of an inert fluid, the manifold block including parallel fluid lines having a common outlet coupled to said protective enclosure, one branch of said parallel fluid lines including an adjustable leakage-compensation bleed valve, the other branch including a flow-metering means for admitting a measured preselected volume of said inert fluid into said protective enclosure to execute a rapid-response purge cycle; and an explosion-proof module for containing a microprocessor, the microprocessor having a desired program resident therein and including an internal timer, the microprocessor being interconnected with said protective enclosure and said manifold block for monitoring the fluid pressure in said protective enclosure, for executing a rapid-response purge cycle in said protective enclosure in reaction to an undesired fluid-pressure drop in said protective enclosure, for maintaining a desired pressure range during normal operation by compensating for gas leakage and for displaying system status; wherein said explosion proof module including an optically transparent window, an optical code reader looking outwardly through said window, coupled to said programmed microprocessor for receiving modifications of the program resident therein without violating the integrity of the explosion-proof module.

2. The control system as defined by claim 1, comprising:

means for entering the volumetric capacity of said protective enclosure into the microprocessor program via said optical code reader.

3. The system as defined by claim 2, wherein said programmable flow-metering means further comprises:

a pilot valve coupled to the microprocessor, said pilot valve being initially responsive to an undesired fluid pressure-drop below a predetermined level in said protective enclosure as sensed by said microprocessor and subsequent re-establishment of enclosure pressure above the predetermined minimum level;

a fluid-piloted poppet valve under the control of said pilot valve;

a flowmeter of the pitot-tube type in series with said poppet valve and in communication with said microprocessor for defining the measured volume of inert purging fluid which is discharged into said protective enclosure during execution of a rapid-response purging cycle.

4. The system as defined by claim 3, comprising:

means for manually entering the volumetric capacity of said protective enclosure into said microprocessor.

* * * * *